July 24, 1951 R. L. KEELER 2,561,515
ARTIFICIAL FISH BAIT
Filed Feb. 23, 1949 3 Sheets-Sheet 1
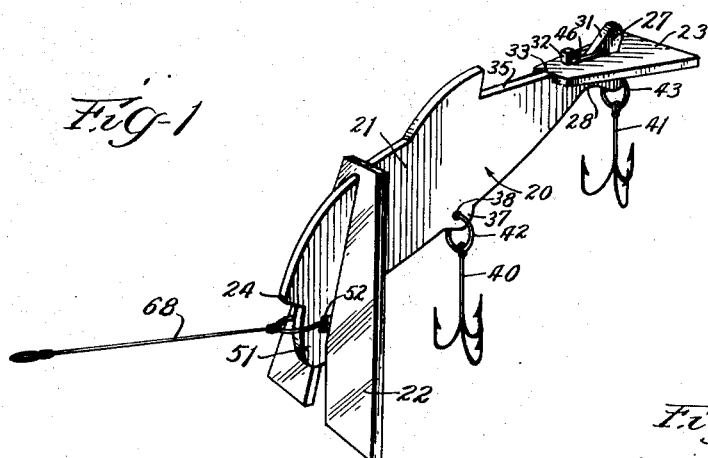
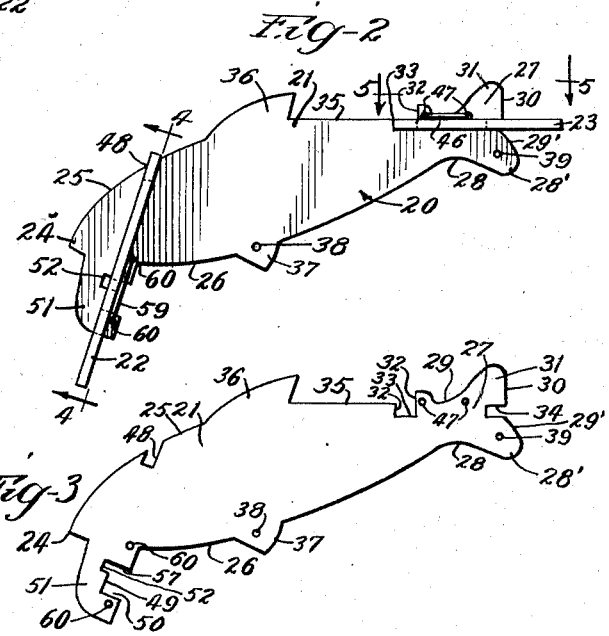
Inventor
Robert L. Keeler
By: Robert H. Tendt
Atty.

July 24, 1951  R. L. KEELER  2,561,515
ARTIFICIAL FISH BAIT
Filed Feb. 23, 1949  3 Sheets-Sheet 2
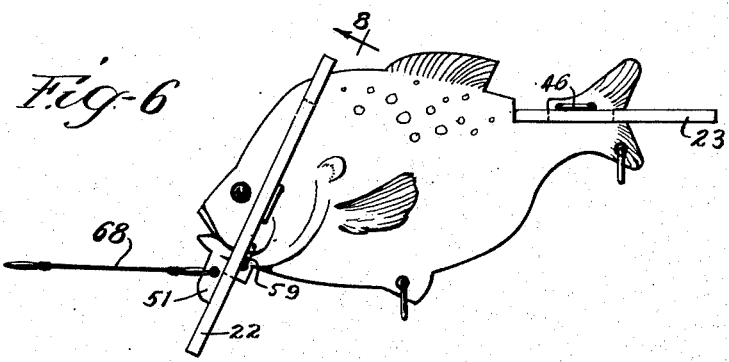
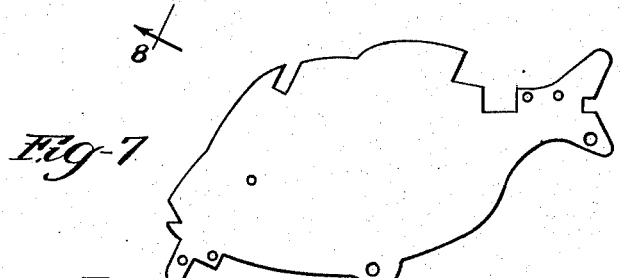
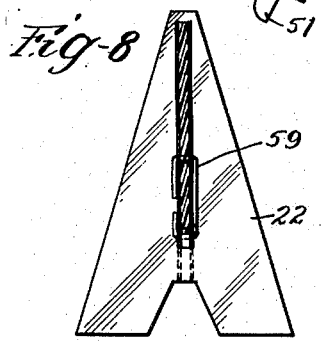
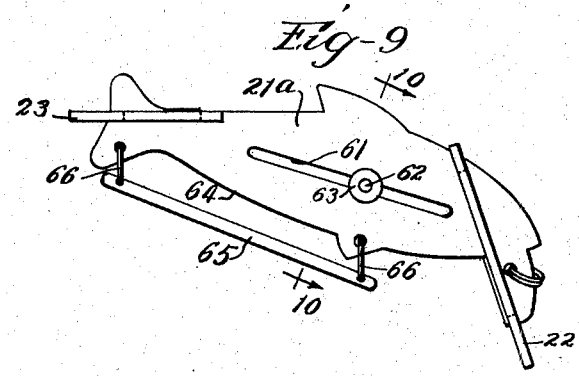
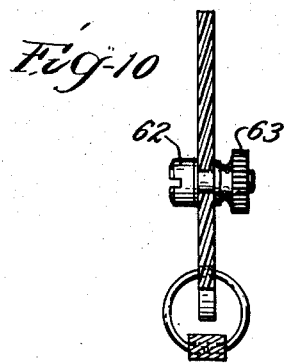
Inventor
Robert L. Keeler July 24, 1951  R. L. KEELER  2,561,515
ARTIFICIAL FISH BAIT
Filed Feb. 23, 1949  3 Sheets—Sheet 3
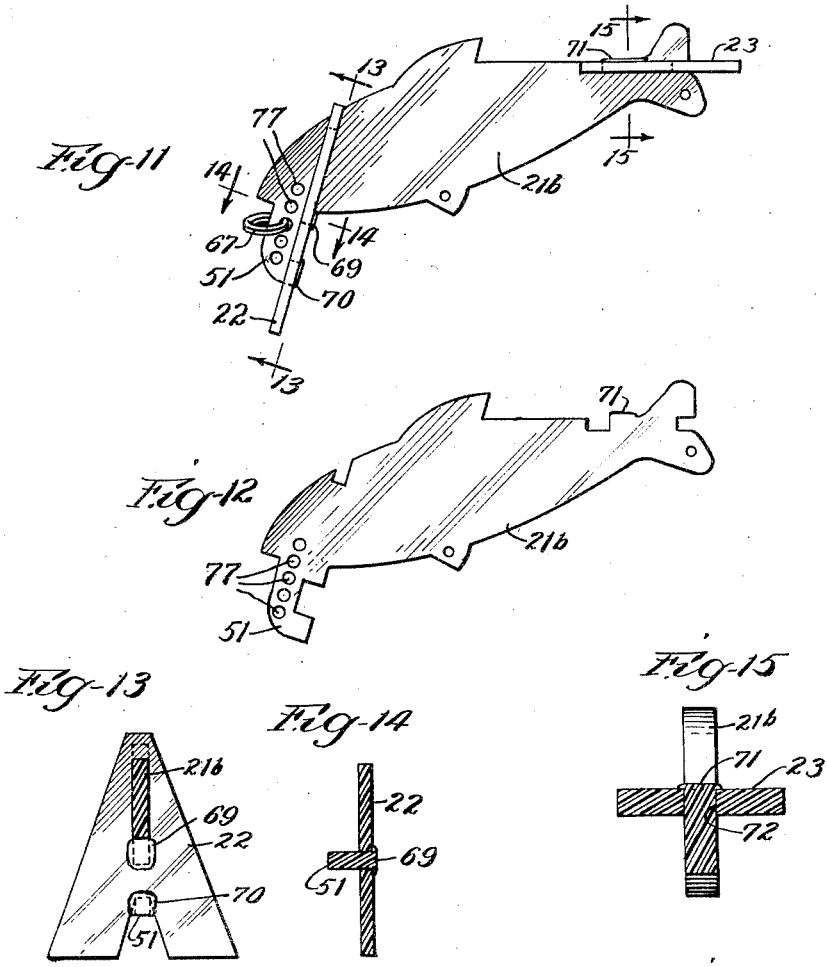

Patented July 24, 1951

2,561,515

UNITED STATES PATENT OFFICE 2,561,515

ARTIFICIAL FISH BAIT

Robert L. Keeler, Chicago, Ill.

Application February 23, 1949, Serial No. 77,903

6 Claims. (Cl. 43—42.51)

1

The present invention relates to artificial fish baits, and is particularly concerned with baits of the type simulating the appearance of a minnow or other small fish and equipped with suitable hook assemblies for catching the larger fish which are attracted to the artificial bait.

One of the objects of the invention is the provision of an improved artificial fish bait of simple structure which is adapted to be drawn through the water by means of a line in such manner that it simulates the natural action of a small fish, wagging back and forth, and darting to the left and the right, while maintaining a substantially even keel at a depth which depends upon the weight and size of the bait and the adjustment of auxiliary weights which may be employed with it.

Another object of the invention is the provision of improved artificial fish lures which may be constructed out of sheet material so that its parts may be made by punching them out of sheets of metal plastic and wood, cardboard, or many other suitable materials, or which may also be molded.

Another object of the invention is the provision of an improved fish lure having a relatively flat body so that the decorative effects applied to the body of the lure may be applied in the form of a flat decalcomania, purchasable at a low cost, so that the lures may be made very attractive and authentic in appearance, without great expense.

Another object of the invention is the provision of improved fish lures comprising a relatively flat body and a plurality of planes and the provision of improved modes of construction by means of which the planes are fixedly secured upon the body with a minimum amount of labor and with a maximum firmness.

Another object of the invention is the provision of an improved artificial fish lure which is durable, simple in construction, easy to manufacture and assemble, effective, and adapted to be manufactured at a very low cost so as to reduce the cost of artificial fish lures for a vast number of purchasers.

Other objects and advantages of the invention will be apparent from the following description and the accompanying drawings, in which similar characters of reference indicate similar parts throughout the several views.

Referring to the three sheets of drawings,

Fig. 1 is a view in perspective of an artificial fish bait embodying the invention, shown in connection with a leader;

2

Fig. 2 is a side elevational view of the fish lure, shown in the position which it assumes when it is being drawn through the water by a line;

Fig. 3 is a side elevational view of the body of the fish lure of Fig. 2;

Fig. 4 is a sectional view, taken on the plane of the line 4—4 of Fig. 2, looking in the direction of the arrows;

Fig. 5 is a sectional view, taken on the plane of the line 5—5 of Fig. 2, looking in the direction of the arrows;

Fig. 6 is a side elevational view of an artificial fish bait embodying my invention, shown as it is being drawn through the water by means of a leader and a line and pole, the line and pole not being shown;

Fig. 7 is a side elevational view of the body of the lure with the stabilizing and directing planes removed;

Fig. 8 is a sectional view, taken on the plane of the line 8—8 of Fig. 6, looking in the direction of the arrows, showing the directing plane in elevation;

Fig. 9 is a view similar to Fig. 1 of a modification which is provided with adjustable weights for determining the elevation at which the lure will be pulled through the water;

Fig. 10 is a sectional view of Fig. 9, taken on the plane of the line 10—10, looking in the direction of the arrows;

Fig. 11 is a side elevational view of modification;

Fig. 12 is a side elevational view of the body of the modification of Fig. 11;

Fig. 13 is a sectional view, taken on the plane of the line 13—13 of Fig. 11, looking in the direction of the arrows;

Fig. 14 is a sectional view, taken on the plane of the line 14—14 of Fig. 11, looking in the direction of the arrows;

Fig. 15 is a sectional view, taken on the plane of the line 15—15 of Fig. 11, looking in the direction of the arrows;

Fig. 16 is a view similar to Fig. 13, showing a modified form of directing plane;

Fig. 17 is a view similar to Fig. 14, showing the mode of securement of the directing plane of Fig. 16 on the body of the lure;

Fig. 18 is a view similar to Fig. 15, showing an alternative mode of securement of the stabilizer plane to the body of the bait.

Fig. 19 is a fragmentary exploded view showing the rear end of the body and the vane 23 with the proportions of their parts and arranged to show how they can be assembled.

The present artificial fish baits are preferably constructed out of sheet material on account of the low cost of cutting the parts from sheet material by means of suitable dies, saws, or the like.

One mode of forming a multiplicity of the parts at the same time is to employ a thin saw or any other tool acting upon a stack of plates, this having the advantage that no die is required. When manufactured in large quantities, the parts may be cut out of sheet metal by means of suitable dies, after which nothing remains to be done, except the assembly and the decoration of the lure, if it is to be decorated.

The present lures preferably employ standard hooks, such as a plurality of three hook assemblies; and the hooks are preferably secured to the lures by means of thin wire spring rings, which may be purchased upon the open market at a low cost.

The present lures may be made out of many different types of sheet material, the one illustrated in Fig. 1 being made out of a sheet magnesium body and transparent plastic directing and stabilizing planes. The planes and body may be made of metal, wood, plastics, impregnated paper, or fiber, or various kinds of sheet material.

When the directing and stabilizing planes are made of transparent material, this makes them substantially invisible in the water, leaving only the body visible, particularly where the index of refraction of the material of which the planes is made, is near to the index of refraction of water. In other embodiments of the invention the directing and/or stabilizing planes may be made of the same kind of material as the body, or of any other opaque material, as the presence of these planes does not detract seriously from the appearance of the lure, even when the planes are not transparent.

In the embodiment of Fig. 1, 20 indicates one form of my improved fish lure, which includes a flat or plane body 21, preferably made of sheet material, a directing plane 22, and a stabilizing plane 23. The pattern for the body 21 is shown in Fig. 3; and this body is made, in the example shown, of a light metal such as a magnesium sheet of uniform thickness. Other light metals, such as aluminum or aluminum alloys, may be employed, or some of the heavier metals, such as brass, iron steel, galvanized iron, or tin coated iron, may be employed, the thickness of the sheet being diminished suitably to reduce the weight.

The thickness of the sheet, when constructed of magnesium, may be substantially as shown in Figs. 1, 4, and 5; but for the heavier metals the sheet material is preferably much thinner. The body 21 has the general shape of a small fish or minnow, except for suitable formations for simulating the fins and tail and for attachment of the parts.

Thus the head of the body comes to a point at 24, this being the intersection of the curved upper outline 25 and the curved lower outline 26, which are curves on a fairly long radius. The radius of curvature of these two outlines preferably decreases toward the tail 27, where there is a narrow concavely curved outline at 28 and 29 and a tail formation 27.

The lower part 28' of the tail may extend in the usual direction, having a diagonally extending end surface 29'; but the end surface 30 of the upper tail portion 31 is preferably straight, parallel to the walls 32 of a slot 33 for facilitating the assembly of the stabilizer plane 23 with the body.

There is an inwardly exending longitudinal slot 34 in the end of the tail 27, this slot being rectangular and of substantially the same width as the thickness of the stabilizer plane 23. The base of the slot 33 in the top of the body and the lower side of the slot 34 in the tail are preferably on the same plane; and this plane extends substantially parallel to the straight part 35 of the upper edge.

Otherwise expressed, the stabilizer plane 23 extends diagonally downward with respect to the main axis of the lure.

The body 21 is provided at its upper edge with a convexly curved fin formation 36 and at its lower edge with another fin formation 37, the latter being forwardly of the fin 36 and provided with an aperture 38 for attachment of a hook assembly.

The lower tail portion 28 is also provided with a through aperture 39 for attachment of a hook assembly. These hook assemblies preferably comprise standard three-prong hooks 40, 41, which are secured to the body by means of a resilient spring ring 42, 43 made of very small diameter spring wire, similar to a key ring.

The rings 42, 43 pass through the body apertures 38, 39 and through the eyes of the hook assemblies so that the hooks depend from the body, and by means of their weight tend to keep the body in vertical or upright position and to give it dynamic stability.

The stabilizing plane 23 preferably consists of a trapezoidal sheet of transparent sheet material, such as plastic, which is provided with a through aperture 44 (Fig. 5) of rectangular shape and of sufficient size to embrace that portion of the body which is between the wall 32 of slot 33 and the vertical base of slot 34.

While the stabilizing vane 23 is shown as trapezoidal, it may be made triangular or even rectangular, and its corners may be rounded, or it might be made oval. It is preferably made with angular corners on a pattern that can be cut out of sheet material without waste, and preferably tapers forwardly like the tail of a fish.

The hole 44 is located in such manner as to leave at the front or upper end of the stabilizing plane 23 a portion 45 which is wide enough to fit in the slot 33. It is more important that the hole 44 engage tightly against the base of the slot 34 and the side wall of slot 33, as this makes the stabilizing vane 23 rigid on the body.

It is also important that width of the hole 44 be a good fit with respect to the thickness of the body 21; but this may be remedied partly by the securing clip 46, which may be an ordinary wire clip, passing through holes 47 in the body and bent over on the other side in such a position that it engages the top of the stabilizing vane 23. Thus the stabilizing vane or plane 23 is rigidly secured to the rear of the body.

At its front end the upper edge 25 of the fish-like body 21 has a downwardly and forwardly extending rectangular slot 48, the front wall of which is in substantially the same plane as the base 49 of another slot 50 on the lower side of the body. The lower side of the body 21 has a forwardly and downwardly extending integral lug 51, the rear edge of which is provided with the slot 50 for receiving a part of the directing vane or plane.

The slot 50 is rectangular, except for the fact that its base 49 has a smaller slot 52 extending further inward in the lug 51 for reception of a leader ring, a line, or one of the split wire rings by means of which it is attached to the line.

The directing plane 22 may consist of a substantially triangular transparent sheet member; and in the embodiment of Fig. 1 it is substantially the shape of a capital A, having a flat edge 53 at its upper end and having a V-shaped slot 54 in its lower edge 55.

This vane or plane may also be made oval or rectangular or provided with rounded edges, or the V-shaped slot 54 may be omitted.

The directing vane 22 has a vertically extending through aperture 56 of rectangular shape which is of sufficient width to fit on the flat body 21 and of sufficient length to extend from the base of the slot 48 to the upper wall 57 of the slot 50.

Below the aperture 56 in the directing vane 22 there remains a transverse integral portion 58 which is of sufficient width to fit in the slot 50. The directing vane 22 is preferably secured in place by means of a wire clip 59 which has its legs passing through the two apertures 60, the legs being bent over on the opposite side toward each other, and the clip being located flatly against the rear side of the directing vane 22.

The mode of assembly of the parts is as follows. For the stabilizer vane 23 the rear end of the aperture in this vane is placed over the upper tail portion 31, and the edge of the stabilizer is pushed forward into the slot 34. Thereafter the front edge is tilted downward until it moves into the slot 33 in the position of Fig. 2, where it is secured by means of the clip 46.

To assemble the front vane 22 with the body, the lug 51 of the body must first be inserted in the aperture 56 of the vane; and thereafter the upper part of the vane is tilted backward until it is above the slot 48. The ring of leader 68 is inserted in groove 52 before the vane 22 is moved forward into the slot 50. The vane is then shoved down into the slot 48; and when it reaches the base of the slot 48, the transverse portion 58 is in position to be pivoted slightly in a clockwise direction into the slot 50, where it is secured against the base of slot 49 by means of clip 59.

Referring to Figs. 6 to 8, these are views showing a modification of a larger size to simulate a sun fish instead of a minnow. Whereas the magnesium body 21 may be left in its shiny bright condition, the flat sides of such a body may be ornamented or painted or provided with a decalcomania which shows an authentic picture of the fish in question. The sides being flat and plane, such a decalcomania can be attached before the planes are attached; and decalcomanias can be provided which are authentic reproductions of the fish which the bait is to simulate. Thus the fish lure of Figs. 6 to 8 may be similar in construction to that previously described, except that the body is deeper and of different shape to simulate the sun fish.

Referring to Figs. 9 and 10, these show a modification of Figs. 1 to 5, in which the body of the fish is provided with auxiliary weights for increasing the depth at which the artificial bait will be located when it is being drawn through the water by a line.

In this case the body is indicated at 21a, and it is of similar shape to that described in Fig. 1, except that it may have a longitudinally extending through slot 61, which is provided with a headed screw bolt 62 and nut 63 that may be clamped in any adjusted position longitudinally of the body 21a.

The screw bolt may be made of brass or aluminum or magnesium or any suitable metal of the desired weight; and the center of gravity of the lure is changed by sliding the screw bolt 62 and nut 63 forwardly or backwardly. Sliding it forwardly tends to cause the lure to be located at a lower depth in the water; and sliding the weight backwardly tends to cause the lure to be drawn at a higher level through the water.

Instead of the adjustable weight 62, 63, the lure body 21a may be provided with a weight attached to its lower rear edge, such as, for example, the edge portion 64, by means of small self-tapping screw bolts; or the weight 65, consisting of a rod or wire of metal, may be pierced at its ends to receive the resilient split rings 66, which are also used to support hook assemblies in Fig. 9.

The present lures may also be used as toys for children; and in such case the hook assemblies would be omitted, as shown in Fig. 9.

Referring now to Figs. 11 to 15, these are views of another modification, which may be provided with the same rings and hook assemblies, as shown in Fig. 1, and with an additional ring 67 located in the depending lug 51 immediately below the nose of the body 21b.

The ring 67 is used for attaching a line or leader, and replaces the leader 68 of Figs. 1 and 6, which may be constructed of a short length of fine wire with a twisted loop at each end.

In the embodiment of Figs. 11 to 15 the directing and stabilizing planes or vanes are attached to the body in a different manner, eliminating the clips 46 and 59. In this embodiment the rearwardly projecting portions of the lug 51 may extend slightly beyond the front vane 22; and they may be riveted over, as indicated at 69, 70, by the application of heat and pressure, or by swaging the end portions 69, 70.

The same is true of the rear vane 23, which may be secured in place by swaging or spreading the upwardly projecting portion 71 of the body, which passes through the aperture 72 in the vane 23, as shown in Fig. 15. A plurality of holes 77 may be provided in the fore part of the body for selection in varying the depth to which the bait goes when it is drawn through the water, as shown in Fig. 11.

Referring to Figs. 16 to 18, these are views showing alternative forms of securing the front and rear vanes in place. In this case a flat piece of plastic material, such as the rectangular piece 74 (Fig. 16) is laid over the end of that portion which passes through the aperture in the vane 22 and cemented or integrally welded in place by the application of heat or by means of a solvent, which, when applied to some plastics, dissolves surface portions so that they may thereafter become integrally welded together.

Another piece 75 of plastic is used in Fig. 18 for securing the rear vane to the body by cementing, welding, or the like.

The operation of my artificial fish baits is as follows. When the bait is thrown in the water and drawn forwardly by means of a line attached to the nose of the body, the depending hook assemblies tend to keep the thin flat body in vertical position and right side up. The diagonally forwardly and downwardly extending vane or directing vane impinges upon the water as the lure is drawn forward and tends to cause the lure to dive downwardly; but this is opposed by the attachment of the line, which pulls forwardly and upwardly.

The rear or stabilizing vane tends to determine the horizontal position of the bait in the water and tends to hold the bait in the positions which are shown in Figs. 1, 6, and 11, with the nose of the face depending slightly downwardly.

The rear horizontal vane acts as a stabilizer and tends to keep the bait on an even keel at a predetermined depth which depends upon the weight of the bait, which in turn depends on the material of which it is made.

The point of attachment of the line is also a factor in varying the depth to which the bait goes when it is drawn through the water; and in some embodiments of the invention a plurality of holes 77 may be provided for the leader or forward ring to vary this factor, as shown in Fig. 11.

The body of the bait may be made to resemble various types of fish, such as the minnow, the elongated perch, or the oval sun fish. The exact design and coloring of the fish may be simulated, or the sheet body may be stamped with a scale effect.

The parts can be die cut, blanked, or stamped; or, if necessary, molded out of plastic materials in one piece or in a plurality of pieces. Various materials may be employed, such as plastic, metal, rubber, and other compositions.

One of the most important features of the invention is the action of the bait in the water, which simulates that of a live bait so closely that the present artificial fish bait is very effective in attracting fish.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In an artificial fish bait, the combination of a body member comprising a flat piece of sheet material of substantially the shape of a fish in side elevation, having upwardly and downwardly extending tail parts at one end, said body having apertures along its lower edge at the downwardly extending tail part and substantially midway between its ends, a hook assembly pivotally mounted at each of said apertures, said body having a forwardly and downwardly integral depending lug below the front end of the body, and having an aperture arranged in said body for attachment of a line and front and rear vanes of plastic composition, the front vane having a rectangular aperture receiving and fitting on the front end of said body, and said front vane extending forwardly and downwardly behind said transverse apertures, and said rear vane having an aperture receiving the upwardly extending part of said tail, said rear vane extending substantially in the direction of the upper edge of the body at its point of attachment and both said vanes being made of flat sheet material.

2. In an artificial fish bait, the combination of a body member comprising a flat piece of sheet material of substantially the shape of a fish in side elevation, having upwardly and downwardly extending tail parts at one end, said body having apertures along its lower edge at the downwardly extending tail part and substantially midway between its ends, a hook assembly pivotally mounted at each of said apertures, said body having a forwardly and downwardly integral depending lug below the front end of the body, and having an aperture arranged in said body for attachment of a line and front and rear vanes of plastic composition, the front vane having a rectangular aperture receiving and fitting on the front end of said body, and said front vane extending forwardly and downwardly behind said transverse apertures, and said rear vane having an aperture receiving the upwardly extending part of said tail, said rear vane extending substantially in the direction of the upper edge of the body at its point of attachment and both said vanes being made of flat sheet material, the said front vane being of substantially A-shape and the rear vane being trapezoidal, with the upper end of the front vane directed upward and backward and the upper end of the rear vane directed forward.

3. In an artificial fish bait, the combination of a body member comprising a flat piece of sheet material of substantially the shape of a fish in side elevation, having upwardly and downwardly extending tail parts at one end, said body having apertures along its lower edge at the downwardly extending tail part and substantially midway between its ends, a hook assembly pivotally mounted at each of said apertures, said body having a forwardly and downwardly integral depending lug below the front end of the body, and having an aperture arranged in said body for attachment of a line and front and rear vanes of plastic composition, the front vane having a rectangular aperture receiving and fitting on the front end of said body, and said front vane extending forwardly and downwardly behind said transverse apertures, and said rear vane having an aperture receiving the upwardly extending part of said tail, said rear vane extending substantially in the direction of the upper edge of the body at its point of attachment and both said vanes being made of flat sheet material, with an integral part of said body extending through each vane and upset on the outside of each vane to secure the vanes to the body.

4. In an artificial fish bait, the combination of a body member comprising a flat piece of sheet material of substantially the shape of a fish in side elevation, having upwardly and downwardly extending tail parts at one end, said body having apertures along its lower edge at the downwardly extending tail part and substantially midway between its ends, a hook assembly pivotally mounted at each of said apertures, said body having a forwardly and downwardly integral depending lug below the front end of the body, and having an aperture arranged in said body for attachment of a line and front and rear vanes of plastic composition, the front vane having a rectangular aperture receiving and fitting on the front end of said body, and said front vane extending forwardly and downwardly behind said transverse apertures, and said rear vane having an aperture receiving the upwardly extending part of said tail, said rear vane extending substantially in the direction of the upper edge of the body at its point of attachment and both said vanes being made of flat sheet material, the said body being opaque and visible in the water, and the said vanes being transparent and substantially invisible in the water.

5. In an artificial fish bait, the combination of a body member comprising a flat piece of sheet material of substantially the shape of a fish in side elevation, having upwardly and downwardly extending tail parts at one end, said body having apertures along its lower edge at the downwardly extending tail part and substantially midway between its ends, a hook assembly pivotally mounted at each of said apertures, said body having a forwardly and downwardly integral depending lug below the front end of the body, and having an aperture arranged in said body for attachment of a line and front and rear vanes of plastic composition, the front vane having a rectangular aperture receiving and fitting on the front end of said body, and said front vane extending forwardly and downwardly behind said transverse apertures, and said rear vane having an aperture receiving the upwardly extending part of said tail, said rear vane extending substantially in the direction of the upper edge of the body at its point of attachment and both said vanes being made of flat sheet material, the said depending lug having a rearwardly facing groove to receive a complementary part of the front vane, and the body having an upwardly open groove receiving a complementary part of said front vane.

6. In an artificial fish bait, the combination of a body member comprising a flat piece of sheet material of substantially the shape of a fish in side elevation, having upwardly and downwardly extending tail parts at one end, said body having apertures along its lower edge at the downwardly extending tail part and substantially midway between its ends, a hook assembly pivotally mounted at each of said apertures, said body having a forwardly and downwardly integral depending lug at the front end of the body, and having a line attachment aperture in said depending lug, said aperture being located for attachment of a line at a predetermined point, and front and rear vanes of plastic composition, the front vane having a rectangular aperture receiving and fitting on the front end of said body, and said front vane extending forwardly and downwardly behind said line attachment aperture, and said rear vane having an aperture receiving the upwardly extending part of said tail, said rear vane extending substantially in the direction of the upper edge of the body at its point of attachment and both said vanes being made of flat sheet material.

ROBERT L. KEELER.

REFERENCES CITED

The following references are of record in the file of this patent:

UNITED STATES PATENTS

| Number | Name | Date |
|---|---|---|
| 1,345,600 | Keeling | July 6, 1920 |
| 1,875,122 | Olson | Aug. 30, 1932 |
| 2,123,951 | McArthur | July 19, 1938 |
| 2,234,439 | Larson | Mar. 11, 1941 |